United States Patent [19]

Grimes et al.

[11] Patent Number: 4,582,185

[45] Date of Patent: Apr. 15, 1986

[54] CONTROLLED CAPACITY TORQUE CONVERTER CLUTCH

[75] Inventors: Michael R. Grimes, Ypsilanti; Jack P. Koski, Union Lake; William J. Vukovich, Ypsilanti, all of Mich.

[73] Assignee: General Motors Corporation, Detroit, Mich.

[21] Appl. No.: 580,247

[22] Filed: Feb. 15, 1984

[51] Int. Cl.⁴ ............... F16H 45/02; F16D 43/284
[52] U.S. Cl. .................. 192/0.076; 192/3.3; 192/3.31
[58] Field of Search ........... 192/0.076, 3.29, 3.3, 192/3.31, 3.58, 0.032, 0.033

[56] References Cited

U.S. PATENT DOCUMENTS

| | | | |
|---|---|---|---|
| 3,730,315 | 5/1973 | Annis et al. | 192/3.3 |
| 3,752,280 | 8/1973 | Cheek | 192/85 AA |
| 3,822,770 | 7/1974 | Golan | 192/103 F |
| 3,822,771 | 7/1974 | Audiffred et al. | 192/0.084 |
| 3,831,726 | 8/1974 | Woody et al. | 192/103 FA |
| 3,977,502 | 8/1976 | Chana | 192/3.3 |
| 4,004,417 | 1/1977 | Woody et al. | 192/3.31 X |
| 4,033,202 | 7/1977 | Ahlen et al. | 192/3.31 X |
| 4,056,177 | 11/1977 | Ahlen et al. | 192/0.032 |
| 4,181,203 | 1/1980 | Malloy | 192/3.3 |
| 4,223,569 | 9/1980 | Koivunen et al. | 74/665 GE |
| 4,342,545 | 8/1982 | Schuster | 418/26 |
| 4,428,467 | 1/1984 | Hiramatsu | 192/3.31 |
| 4,457,411 | 7/1984 | Hiramatsu | 192/0.076 |
| 4,466,311 | 8/1984 | Hiramatsu | 192/3.58 X |
| 4,468,988 | 9/1984 | Hiramatsu | 192/3.58 X |

FOREIGN PATENT DOCUMENTS

| | | | |
|---|---|---|---|
| 0157859 | 9/1982 | Japan | 192/3.31 |
| 0157860 | 9/1982 | Japan | 192/3.31 |
| 0163732 | 10/1982 | Japan | 192/3.3 |
| 0017061 | 1/1984 | Japan | 192/3.29 |

Primary Examiner—Rodney H. Bonck
Assistant Examiner—Richard M. Lorence
Attorney, Agent, or Firm—Mark A. Navarre

[57] ABSTRACT

The torque capacity of a torque converter clutch is adjusted as a function of the relative magnitudes of the torque converter slip speed and a reference slip speed without regard to the magnitude of the difference therebetween. The adjustment is made according to a predetermined time response characteristic such that steady state engine torque is passed through the converter clutch and engine torque perturbations are not. The reference slip speed is determined so that the resulting torque converter slip is maintained at a relatively low value without causing full clutch engagement.

11 Claims, 13 Drawing Figures

CONTROLLED CAPACITY TORQUE CONVERTER CLUTCH

This invention relates to a control of a torque converter clutch and more particularly to a system for regulating the torque capacity of the clutch to control the torque converter slippage.

Introduced as an efficiency increasing device, the torque converter clutch is a fluid operated friction device engageable to couple the impeller (input) and turbine (output) of a hydraulic torque converter. In the usual application, the clutch is either fully released to permit unrestrained slippage between the impeller and the turbine or fully engaged to prevent such slippage entirely. An unfortunate aspect of full converter clutch engagement is that the engine torque perturbations or torsionals normally absorbed by the torque converter are passed directly through the clutch to the remainder of the vehicle drivetrain and may produce annoying pulsations therein if not properly damped. This factor operates to restrict the usage of the torque converter clutch to specified vehicle operating conditions for which the annoying effects are minimized. As a result, the potential efficiency gains afforded by engagement of the torque converter clutch have only been realized over a portion of the range of vehicle operation.

To overcome the disadvantages of torque converter clutch engagement, it has been proposed to operate the clutch in a slipping mode wherein a predetermined amount of slippage between the torque converter impeller and turbine is permitted for regulating the torque capacity of the clutch. In any such system, the objective is to isolate engine torque perturbations in the torque converter while passing steady state engine torque at a slip rate that provides improved torque converter efficiency. Various systems that control the clutch slippage to achieve the above objectives are disclosed in the U.S. Pat. Nos. to Annis et al. No. 3,730,315 issued May 1, 1973; to Cheek, No. 3,752,280 issued Aug. 14, 1973; to Chana No. 3,977,502 issued Aug. 31, 1976 and to Malloy No. 4,181,208 issued Jan. 1, 1980, such patents being assigned to the assignee of the present invention.

Generally speaking, the systems identified above operate in the classic closed loop manner to generate clutch engagement force that varies in proportion to the amount by which the torque converter slippage (or other measured parameter) deviates from the desired amount. When a large slip error is measured, the control acts to generate a large restoring force to drive the error to zero. However, there is a substantial hydraulic lag between the initiation of a control action and the generation of the corrective clutch engagement force. When the corrective force is actually generated, the magnitude of the error will likely be different than earlier measured and a certain amount of instability may occur. Thus, we have found that the converter clutch mechanism is not readily susceptible to torque capacity control by closed loop techniques of the type described above.

According to the present invention, the clutch engagement force is generated without regard to the magnitude of the slip error. Whenever the measured slip is greater than the desired slip, the controller of this invention acts to increase the clutch engagement force to increase the torque capacity of the clutch. Whenever the measured slip is less than the desired slip, the controller acts to decrease the clutch engagement force to decrease the torque capacity of the clutch. In either case, the torque capacity control is performed according to a predetermined time response characteristic which permits stable regulation of the average amount of slip while isolating engine torque perturbations from the remainder of the vehicle drivetrain. The engine torque perturbations and the variations in slip occasioned thereby, occur at a relatively high frequency with respect to time, and the predetermined time response characteristic of this invention prevents the controller from significantly adjusting the torque capacity of the clutch in response thereto. As a result, the torque perturbations produce variations in the torque converter slip instead of variations in the speed of the turbine. On the other hand, steady state variations in engine torque and the variations in slip occasioned thereby occur at a relatively low frequency with respect to time and the predetermined time response characteristic of this invention allows the controller to adjust the torque capacity of the clutch in response thereto. As a result, the converter is operated in a manner to transmit steady state engine torque to the remainder of the vehicle drivetrain while maintaining the average amount of torque converter slip over a period of vehicle operation at a relatively low value to improve the efficiency of the torque converter.

According to a further aspect of this invention, the desired converter slip amount is varied in relation to the predicted engine torque perturbation magnitude so that the torque converter slippage is regulated at the lowest average value without resulting in full engagement of the torque converter clutch. For a given family of engines, the relation between speed, throttle position and torque perturbation magnitude is predictable to a certain extent and this relation is taken advantage of according to this invention by estimating the level of engine torque perturbation as a function of the turbine speed and throttle position, and by adjusting the desired converter slip value to permit increasing levels of converter slip with increasing levels of estimated engine torque perturbation.

As with prior transmission control systems which completely engage the torque converter clutch, there are certain operating conditions for which the torque capacity control of this invention is not desired. For example, when the driver requests a large performance increase, the clutch should be disengaged to permit higher engine speed and to take advantage of the torque multiplication afforded by the torque converter. However, sudden disengagement or release of the clutch under such conditions, may produce an annoying driveline jerk. This difficulty is overcome by the control system of this invention by progressively reducing the torque capacity of the clutch at a controlled rate until it is completely disengaged, thereby providing a controlled and jerk-free clutch release. When the reduced slip operation is once again appropriate, the torque capacity of the clutch is increased in accordance with the predetermined time response characteristic of the controller as described above.

IN THE DRAWINGS

FIGS. 3a and 3b are graphs depicting cyclic engine torque perturbation and the corresponding cyclic variations in converter slip.

FIGS. 5a and 5b are time based graphs illustrating the operation of the control system according to the teachings of this invention.

FIGS. 6a, 6b and 6c are time based graphs depicting the controlled engagement release feature of this invention.

Figure 1:
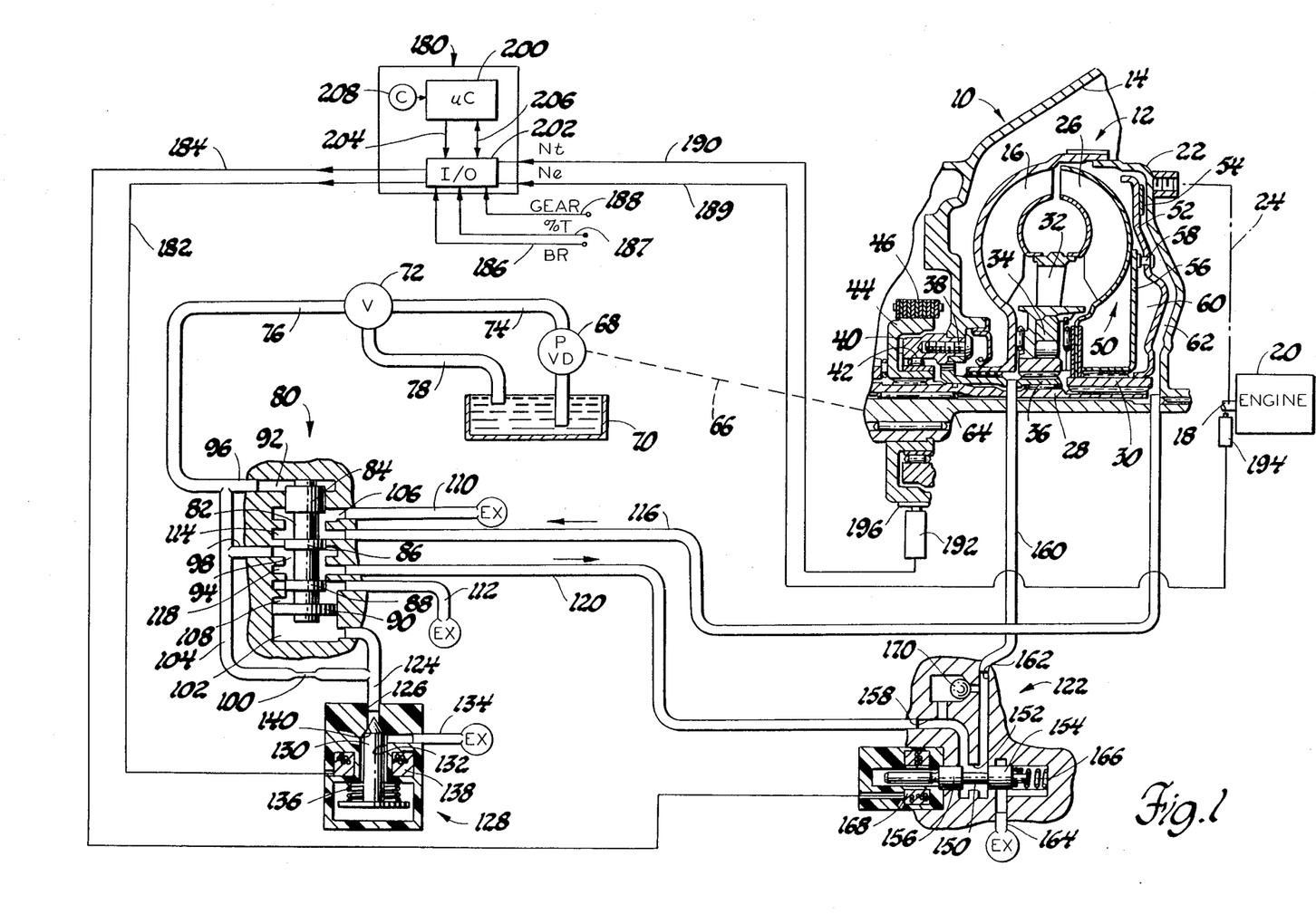
FIG. 1 is a schematic and cross-sectional diagram depicting the torque converter clutch, certain transmission fluid handling elements, and a microcomputer-based control unit for carrying out the control functions of this invention.

Referring now more particularly to FIG. 1, reference numeral 10 generally designates a portion of an automatic transmission including a conventional fluidic torque converter 12 disposed within the transmission housing 14. The impeller or input member 16 of torque converter 12 is connected to be rotatably driven by the output shaft 18 of engine 20 through the input shell 22, as indicated by the dashed line 24. The turbine or output member 26 of the torque converter 12 is rotatably driven by the impeller 16 by means of fluid transfer therebetween, and is connected to rotatably drive the torque converter output shaft 28 through a splined hub member 30. The stator 32 redirects the fluid coupling impeller 16 to the turbine 26 and is connected through a one-way device 34 and a splined sleeve shaft 36 to the transmission housing 14 by fasteners 38. Also, disposed within the housing 14 and preferably integral with sleeve shaft 36 is a bearing support member 40 in which is disposed a needle bearing 42 for rotatably supporting a drive sprocket 44. The converter output shaft 28 is splined in the drive sprocket 44, and a chain 46 drivingly connects the drive sprocket 44 to a complementary drive sprocket (not shown) for providing a plurality of distinct speed ratios between the converter output shaft 28 and the transmission output shaft. A suitable gear set and the controls therefor are described in detail in the U.S. Pat. No. 4,223,569, to Koivunen et al. issued Sept. 23, 1980, and assigned to the assignee of the present invention.

Also disposed within the transmission housing 14 is a torque converter clutch assembly, generally designated by the reference numeral 50. Clutch 50 includes a clutch plate 52 having a friction surface 54 and a drive disc 56 coupled for rotation to clutch plate 52 by rivet connector 58. The drive disc 56 and plate 52 are axially slidable on hub member 30, and the drive disc 56 is splined onto hub member 30 so that the engagement of friction surface 54 of clutch plate 52 with the input shell 22 provides a mechanical drive between the input shell 22 and the converter output shaft 28.

Clutch plate 52 divides the space between turbine 26 and input shell 22 into two fluid chambers: and apply chamber 60 and a release chamber 62. When the fluid pressure in the apply chamber 60 exceeds that in the release chamber 62, there is a resultant force which tends to move the friction surface 54 into engagement with input shell 22. Such force tends to reduce the slippage between the impeller 16 and turbine 26 and when sufficiently great, fully engages the clutch 50 to prevent such slippage entirely. When the fluid pressure in release chamber 62 exceeds that in apply chamber 60, there is a resultant force which tends to move the friction surface 54 out of engagement with input shell 22. Such force tends to increase the slippage between impeller 16 and turbine 26, and when sufficiently great fully releases the clutch 50 to permit unrestrained slippage therebetween. The control system of this invention operates as described below to control the fluid pressure in the apply and release chambers 60 and 62 to control the amount of slippage between the impeller 16 and the turbine 26. As such, the remainder of the elements depicted in FIG. 1 are devoted at least in part to such purpose.

The input shell 22 has splined thereto a pump drive shaft 64 which extends coaxial with and through converter output shaft 28 and drive sprocket 44 and which is mechanically connected as indicated by the broken lines 66 to drive a positive displacement hydraulic pump (P) 68. The pump 68 supplies hydraulic fluid from fluid reservoir 70 to the torque converter 12, the transmission control valves, the various clutches and brakes of the transmission gear set, and the transmission lubrication and cooling systems. The pump 68 is preferably of a variable displacement design, such as that shown in the U.S. Pat. No. 4,342,545 to Schuster issued Aug. 3, 1982, and assigned to the assignee of the present invention; however, a fixed displacement pump will perform satisfactorily. A pressure regulator valve (V) 72 is connected to pump output line 74 and serves to regulate the fluid pressure (hereinafter referred to as line pressure) in line 76 by returning the controlled portion of the pump output fluid to fluid reservoir 70 via line 78. A pressure regulator valve meeting the above specifications is described in detail in the above-referenced patent to Schuster U.S. Pat. No. 4,342,545.

Reference numeral 80 generally designates a spool valve selectively actuable to enable or disable engagement of the torque converter clutch 50. The valve 80 comprises a spool 82 having four lands 84, 86, 88 and 90 formed thereon. The lands 84, 86 and 88 are of equal area, and the land 90 is of significantly larger area as shown. Hydraulic fluid from line 76 is routed directly to the valve chambers 92 and 94 via the lines 96 and 98 and through a restriction 100 to the valve chamber 102 via line 104. The valve chambers 106 and 108 are exhausted to the fluid reservoir 70 through the exhaust 110 and 112. The valve chamber 114 is connected via line 116 to the release chamber 62 of torque converter clutch mechanism 50 and the valve chamber 118 is connected via line 120 to a solenoid operated torque capacity control valve, generally designated by the reference numeral 122.

The valve chamber 102 of spool valve 80 is further connected via line 124 to the input port 126 of a solenoid operated pintle valve, generally designated by the reference numeral 128. The pintle valve 128 comprises a pintle 130 axially movable within the valve bore 132 to selectively connect its input port 126 to exhaust line 134 which in turn, directs fluid back to the fluid reservoir 70. A spring 136 resiliently biases the pintle 130 downward to connect the input port 126 to exhaust line 134, and a solenoid coil 138 is electrically energizable to overcome the resilient force of spring 136 and move the pintle 130 into engagement with the valve seat 140 to isolate the input port 126 from exhaust line 134

In FIG. 1, the solenoid coil 138 is depicted in the energized condition bringing pintle 130 into engagement with the valve seat 140 to isolate input port 126 from exhaust line 134. As such, line pressure is applied to the valve chamber 102 of spool valve 80, and the spool 82 thereof is directed upward as indicated. In such position, line pressure from line 98 is directed to the line 120, and the line 116 is exhausted to fluid reservoir 70 through exhaust line 110. When the solenoid coil 138 is de-energized, spring 136 moves pintle 130 away from the valve seat 140 and the fluid pressure in the valve chamber 102 is exhausted to the fluid reservoir 70 through exhaust line 134. In such case, the line pressure in valve chamber 92 urges the spool 82 downward. In such position, the line pressure in line 98 is directed to line 116 to pressurize the release chamber 62 of torque converter clutch mechanism 50 for disengaging the same and the line 120 is exhausted to the fluid reservoir 70 through the exhaust line 112.

In the manner described above, the valves 80 and 128 enable or disable engagement of the torque converter clutch 50. When the solenoid coil 138 is energized, as shown in FIG. 1, the release chamber 62 of the torque converter clutch mechanism 50 is exhausted to fluid reservoir 70 through line 116 and exhaust line 110. In such state, the engagement of the clutch mechanism 50 is controlled by the operation of the torque capacity control valve 122, as will later be described. When the solenoid coil 138 is de-energized, the release chamber 62 of the torque converter clutch mechanism 50 is filled with hydraulic fluid at line pressure from line 98 to effectively disable engagement of the clutch 50.

The torque capacity control valve 122 comprises a spool 150 axially movable within the valve bore 152 and a pair of equal area lands 154 and 156 formed thereon. The line 120 from spool valve 80 is connected to port 158 and the line 160 connects the port 162 to the apply chamber 60 of torque converter clutch mechanism 50 through the torque converter mechanism 12. The position of valve spool 150 is controlled in a manner to be described for connecting the line 160 to either the line 120 to increase the engagement force of the torque converter clutch mechanism 50 or to the exhaust line 164 to decrease the engagement force of the torque connector clutch 50. A spring 166 urges the spool 150 to the left as shown in FIG. 1, and a solenoid coil 168 is energizable to move the valve spool 150 to the right against the leftward force provided by spring 166. In the former position (that is, the position depicted in FIG. 1), the hydraulic fluid in line 120 is directed to line 160 for increasing the engagement force of the clutch mechanism 50. In the latter position, the fluid pressure in apply chamber 60 of converter clutch mechanism 50 is exhausted to fluid reservoir 70 through line 160 and exhaust line 164 for decreasing the engagement force of the clutch mechanism 50. According to the present invention, the solenoid coil 168 is pulse-width-modulated, and the duty cycle of pulse-width-modulation is adjusted to control the degree of converter clutch engagement, and hence the torque capacity of the clutch mechanism 50. However, such control is only possible when converter clutch engagement is enabled by energization of the solenoid coil 138 of pintle valve 128. When the solenoid coil 138 is de-energized, line 120 is exhausted to fluid reservoir 70 through exhaust line 112 as described above, and a check ball mechanism 170 unseats to permit hydraulic fluid in apply chamber 60 to be quickly exhausted through lines 160, 120 and exhaust line 112.

The energization of solenoid coils 138 and 168 is controlled by an electronic control unit 180 via lines 182 and 184, respectively. The control is made in response to a number of input signals including a brake signal (BR) on line 186, an engine throttle signal (%T) on line 187, a transmission gear signal (GEAR) on line 188, an engine speed signal ($N_e$) on line 189, and a turbine speed signal ($N_t$) on line 190. The brake signal may be obtained with a switch mechanism (not shown) responsive to movement of the vehicle brake pedal such that depression of the brake pedal causes a change in the output state of the brake signal. The engine throttle signal may be obtained with a suitable transducer, such as a rotary potentiometer (not shown) responsive to the position of the accelerator pedal or engine throttle for producing an electrical output signal in accordance therewith. The transmission gear signal may be obtained with suitable pressure transducers (not shown) located with respect to the fluid conducting passages of the transmission 10 in a manner to determine which gear ratio is engaged. The turbine speed and engine speed signals are obtained from speed transducer 192 and 194, respectively. The speed transducers 192 and 194 may be of the variable reluctance type which cooperate with magnetic gear teeth formed on the surface of a rotating shaft. Thus, the speed transducer 192 cooperates with the gear teeth 196 of the drive sprocket 44, and the speed transducer 194 cooperates with the gear teeth of the engine flywheel or other like rotating member.

As indicated in FIG. 1, the electronic control unit 180 essentially comprises a microcomputer ($\mu$C) 200, an input/output (I/O) device 202, which communicates with microcomputer 200 via an address and control bus 204 and a bi-directional data bus 206, and a high frequency clock 208 for supplying microcomputer 200 with a high frequency pulse train for controlling the operational timing of the same. Microcomputer 200 is preferably of the type including internal Random-Access-Memory (RAM), Read-Only-Memory (ROM) and timing circuitry, one such being the MC6801 microcomputer manufactured by Motorola Semiconductor Products, Inc. Austin, Tex. The brake, throttle, gear, engine speed and turbine speed signals on lines 186, 187, 188, 189 and 190 are applied as inputs to input-/output device 202, and input/output device 202 includes circuitry for converting analog input signals to a digital format and for developing suitable control signals on lines 182 and 184 for controlling the energization of solenoid coils 138 and 168 in response to duty cycle commands developed by microcomputer 200. A flow diagram representative of suitable program instructions for performing the control functions of this invention is given in FIGS. 7-9.

Figure 2:
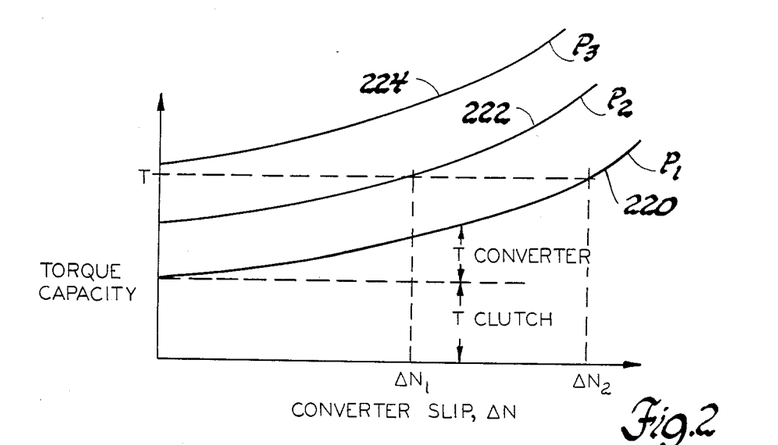
FIG. 2 is a graph depicting the torque capacity of the torque converter and clutch as a function of the torque converter slip N for various levels of clutch engagement pressure $P_1$, $P_2$ and $P_3$.

The present invention is directed to a system for regulating the torque capacity of the clutch mechanism 50 so that the converter output shaft 28 and the remainder of the vehicle drive train receive the steady state engine output torque but not the engine torque perturbations. The traces 220, 222 and 224 of FIG. 2 depict the torque capacity of the torque converter and clutch assembly as a function of the torque converter slip $\Delta N$ for increasing levels of fluid pressure $P_1$, $P_2$ and $P_3$ in the apply chamber 60 of torque converter clutch mechanism 50. For each trace, the total torque capacity may be viewed as having two separate components: that provided by the torque converter 12 and that provided by the torque converter clutch mechanism 50. This relationship is depicted for the trace 220 in FIG. 2. The torque capacity provided by the clutch mechanism 50 is substantially constant and the torque capacity provided by the torque converter 12 increases with increasing levels of slip. As expected, higher fluid pressure in apply chamber 60 produces greater clutch engagement force and greater torque capacity, or less slip for the same level of torque capacity. Thus, a torque capacity corresponding to the letter T may be provided with a torque converter slip amount of $\Delta N_1$ by maintaining the apply chamber pressure at a level corresponding to $P_2$ or with a torque converter slip level of $\Delta N_2$ by maintaining the apply chamber pressure at a level corresponding to $P_1$.

Figure 3A:
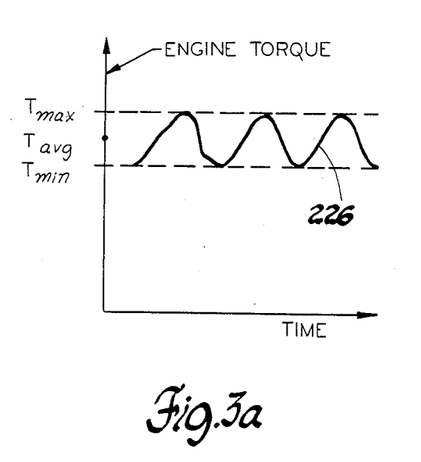
FIG. 3a depicts the engine torque as a function of time.
Figure 3B:
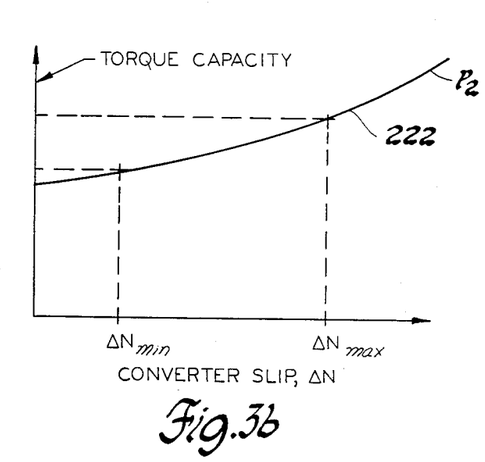
FIG. 3b depicts the torque capacity of the torque converter and clutch as a function of converter slip N at the clutch engagement pressure $P_2$ depicted in FIG. 2.

The trace 222 of FIG. 2 is reproduced in FIG. 3b, and the trace 226 which represents the engine torque as a function of time is given in FIG. 3a. The steady state engine torque is designated by the label $T_{avg}$ and the minimum and maximum torque excursions are designated by the labels $T_{min}$ and $T_{max}$. If the fluid pressure in apply chamber 60 of torque converter clutch mechanism 50 is maintained at a level corresponding to $P_2$, the maximum engine output torque excursion $T_{max}$ results in a torque converter slip of $\Delta N_{max}$ and the minimum engine output torque excursion $T_{min}$ produces a torque converter slip of $\Delta N_{min}$. Thus, the torque converter slip varies between the values $\Delta N_{min}$ and $\Delta N_{max}$ due to the engine torque perturbations, and the average torque capacity of the torque converter and clutch assembly is maintained at the level of the steady state engine output torque $T_{avg}$. The torque perturbations are not transmitted through the torque converter and clutch assembly; rather, they merely produce changes in the amount of torque converter slip. If the fluid pressure in apply chamber 60 of torque converter clutch mechanism 50 were decreased, the slip values $\Delta N_{min}$ and $\Delta N_{max}$ would increase. While this has no adverse affect on the passage of torque perturbations through the converter assembly, it decreases the efficiency of the transmission. If the fluid pressure in apply chamber 60 of the converter clutch mechanism 50 were increased, the slip values $\Delta N_{min}$ and $\Delta N_{max}$ would decrease. If the pressure were sufficiently increased, the clutch mechanism 50 would fully engage at least part of the time, eliminating the torque converter slip entirely. While such operation may be desirable from the standpoint of transmission efficiency, it also permits the passage of engine torque perturbations through the converter assembly when the clutch mechanism 50 is fully engaged. Thus, the best compromise between transmission efficiency and isolation of engine torque perturbations is attained by controlling the pressure in apply chamber 60 such that the minimum slip value $\Delta N_{min}$ corresponding to the lower peak excursion of the engine output torque $T_{min}$ is maintained slightly above zero. Put another way, the torque capacity of the clutch is maintained at a value slightly less than the lower peak excursion $T_{min}$ of the engine output torque so that full engagement of the clutch mechanism 50 does not occur.

The beneficial operation described above is achieved according to this invention by periodically measuring the torque converter slip $\Delta N$ and by adjusting the fluid pressure in apply chamber 60 of the torque converter clutch mechanism 50 in response to such measurement. A desired slip value is determined in relation to the expected magnitude of engine torque perturbations and the measured slip value is compared to such desired slip value. If the measured slip value is greater than the desired slip value, the fluid pressure in apply chamber 60 is increased to increase the torque capacity of the clutch 50, thereby decreasing the slip. If the measured value is less than the desired value, the fluid pressure in apply chamber 60 is decreased to decrease the torque capacity of the clutch mechanism 50, thereby increasing the amount of torque converter slip. Over a period of operation, the measured slip value corresponds to the average slip value, and the fluid pressure in apply chamber 60 of the torque converter clutch mechanism 50 is controlled such that the average torque capacity of the converter and clutch assembly is maintained equal to the steady state engine output torque value $T_{avg}$. The steady state engine output torque is transmitted through the converter and clutch assembly and the engine torque perturbations serve only to vary the amount of torque converter slip. Thus, the engine torque perturbations are isolated from the remainder of the vehicle drivetrain. The desired slip value is chosen such that the slip is maintained at a relatively low value, yielding relatively high torque transmission efficiency.

According to one aspect of this invention, the desired slip amount is varied in relation to the predicted engine torque perturbation magnitude so that the torque converter slippage is regulated at the lowest average value without resulting in full engagement of the torque converter clutch mechanism 50 at the lower peak excursion of engine output torque. For a given family of engines, the relation between speed, throttle position and torque perturbation magnitude is predictable to a certain extent and this relation is taken advantage of according to this invention by adjusting the desired slip value as a function of the measured throttle position and turbine speed.

Figure 4:
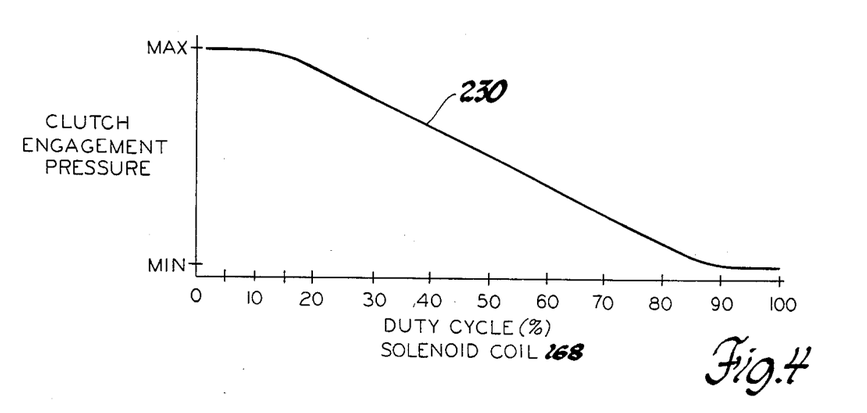
FIG. 4 is a graph depicting the engagement pressure of the converter clutch as a function of the energization duty cycle applied to a solenoid operated fluid valve.
Figure 5A:
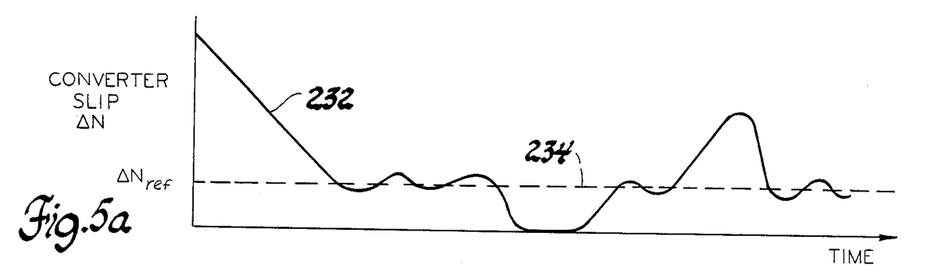
FIG. 5a depicts the torque converter slip N.
Figure 5B:
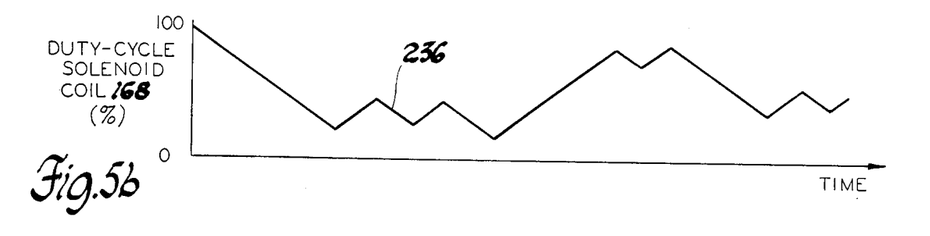
FIG. 5b depicts the resulting control system duty cycle for controlling the clutch engagement pressure.

As indicated in reference to FIG. 1, the fluid pressure in the apply chamber 60 of torque converter clutch mechanism 50 is adjusted according to this invention by varying the duty cycle of pulse-width-modulation applied to the solenoid coil 168 of torque capacity control valve 122. The relationship between the solenoid coil duty cycle and the pressure in apply chamber 60 is graphically depicted in FIG. 4. As explained in reference to FIG. 1, the maximum clutch engagement pressure is attained with continuous de-energization of solenoid coil 168, and the minimum clutch engagement pressure is attained with continuous energization of the solenoid coil 168. Solenoid coil energization duty cycles between zero percent (de-energized) and 100% (continuously energized) produce clutch engagement pressures substantially as shown by the trace 230. In a period of vehicle operation, the solenoid coil energization duty cycle is periodically increased or decreased in accordance with the comparison between the reference slip speed ($\Delta N_{ref}$) and the measured slip speed ($\Delta N$). If the measured slip speed is greater than the reference slip speed, the duty cycle is decreased to increase the fluid pressure in apply chamber 60 for increasing the torque capacity of the clutch mechanism 50. If the reference slip speed is greater than the measured slip speed, the duty cycle is increased to decrease the fluid pressure in apply chamber 60 for decreasing the torque capacity of the clutch mechanism 50. This operation is graphically depicted for a typical period of vehicle operation in FIGS. 5a and 5b, such graphs having a common time base for comparison therebetween. In FIG. 5a, the trace 232 represents the actual or measured slip value $\Delta N$ and the trace 234 represents the desired or reference slip value $\Delta N_{ref}$. In FIG. 5b, the trace 236 represents the duty cycle of pulse-width-modulation applied to the solenoid coil 168 of clutch capacity control valve 122. Although the trace 236 is shown as smooth in FIG. 5b, an expanded time base in that figure would reveal that the trace actually increases and decreases in a stepwise manner since the duty cycle alterations are performed periodically. The rate of increase and decrease is given by the slope of the positive and negative excursions of the trace 236 and such rate is chosen so that the control unit 180 cannot respond to the relatively high frequency engine torque perturbations, but only to the relatively low frequency changes in the steady state engine output torque. The slope of the trace 236 thus establishes the predetermined time response characteristic of this invention and according to the preferred embodiment, is approximately 5% duty cycle increase or decrease per second.

Figure 6A:
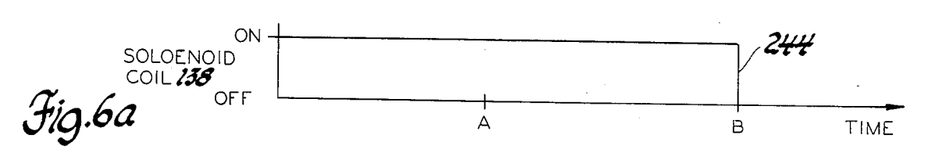
FIGS. 6a and 6b depict the electrical signals applied to solenoid operated fluid valves.
Figure 6B:
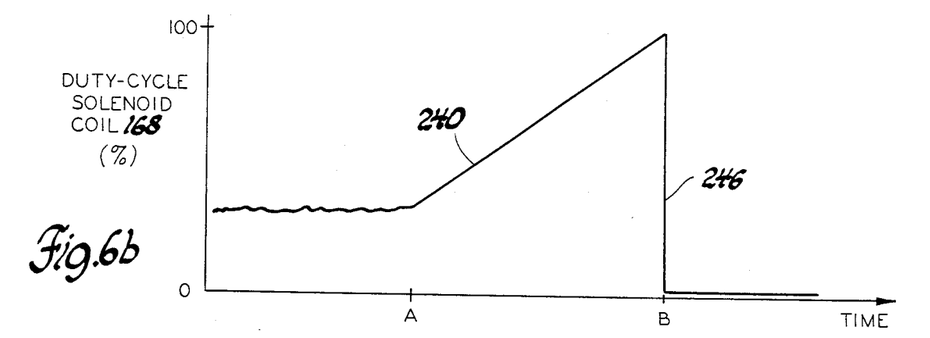
Figure 6C:
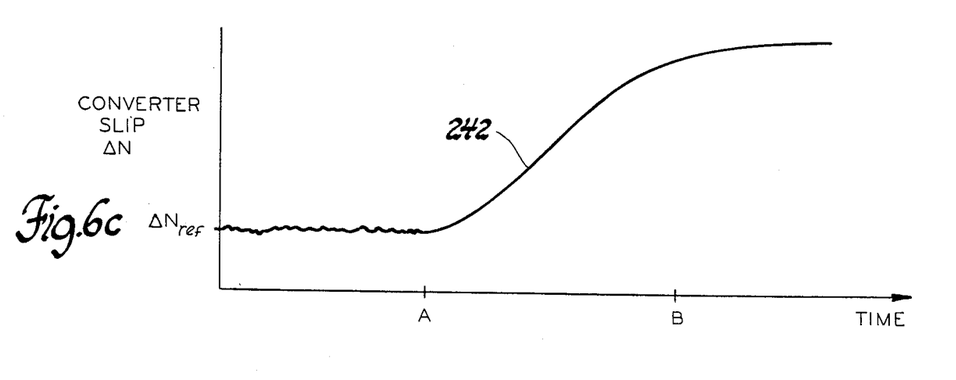
FIG. 6c depicts the resulting converter slip.

The controlled clutch release feature of this invention is graphically depicted in FIGS. 6a, 6b and 6c, such graphs being depicted on a common time base. FIG. 6a depicts the energization state of solenoid coil 138 of pintle valve 128, FIG. 6b depicts the energization duty cycle of solenoid coil 168 of torque capacity control valve 122, and FIG. 6c depicts the torque converter slip $\Delta N$. As indicated above, the controlled release feature of this invention is used to provide smooth disengagement of the torque converter clutch mechanism 50 when clutch control is not desired. The feature is directed primarily to conditions of relatively heavy engine loading for which the clutch should be disengaged to permit higher engine speed and to take advantage of the torque multiplication of the torque converter. At the onset of such conditions, the controlled release feature of this invention serves to progressively reduce the torque capacity of the clutch at a controlled rate so that the disengagement is performed in smooth jerk-free manner. As will later be explained in reference to FIGS. 7-9, the occurrence of vehicle operating conditions of the above type is detected by comparing the current engine throttle position (%T) to a reference throttle position ($T_{ref}$) determined as a function of the transmission speed ratio. When such operation is detected, the energization duty cycle of solenoid coil 168 is progressively increased to decrease the fluid pressure in apply chamber 60 of torque converter clutch mechanism 50. During such period, the duty cycle is increased at a rate which provides acceptable time response but which substantially eliminates the jerk associated with disengagement of the clutch mechanism 50. When the energization duty cycle reaches 100%, both solenoid coils 138 and 168 are de-energized. In FIGS. 6a-6c, the point at which the high throttle vehicle operating condition is sensed is designated by the letter A on the time scales. Prior to point A, substantially steady state conditions prevail. Solenoid coil 138 is energized (FIG. 6a) to enable clutch torque capacity control and the electronic control unit 180 is generating a substantially constant energization duty cycle (FIG. 6b) for solenoid coil 168 to maintain the average amount of converter slip $\Delta N$ (FIG. 6c) at the reference slip value $\Delta N_{ref}$. Beginning at point A, however, the electronic control unit 180 progressively increases the energization duty cycle applied to solenoid coil 168 to thereby progressively decrease the torque capacity of the clutch mechanism 50, as indicated by the reference numeral 240. Consequently, converter slip smoothly increases as shown by the reference numeral 242. When the energization duty cycle for solenoid coil 168 reaches 100% at time B, the clutch engagement pressure in apply chamber 60 is at its minimum value and the controlled release is terminated by de-energizing both solenoid coils 138 and 168, as indicated by the reference numerals 244 and 246. At such time, clutch control is disabled, permitting unrestrained slippage between the torque converter impeller 16 and turbine 26 to provide the performance and torque multiplication requested by the driver. When the high throttle operating condition is over, the clutch control is resumed by re-energizing the solenoid coil 138 and by once again regulating the energization duty cycle of solenoid coil 168 in accordance with the comparison between the actual and reference slip values as described above.

Figure 7:
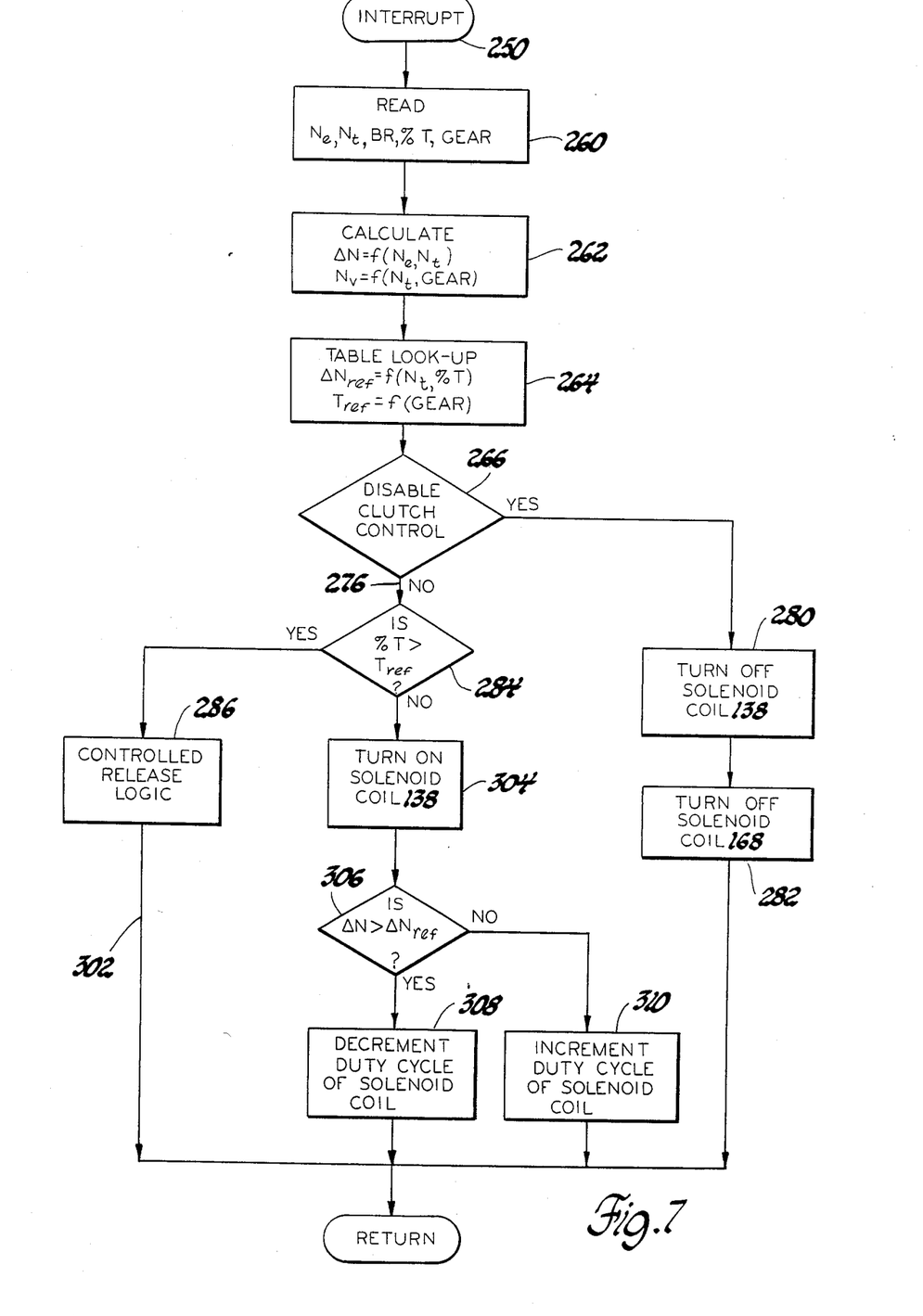
FIGS. 7 through 9 are flow diagrams representative of program instructions executed by the control unit of FIG. 1 in carrying out the control functions of this invention.
Figure 8:
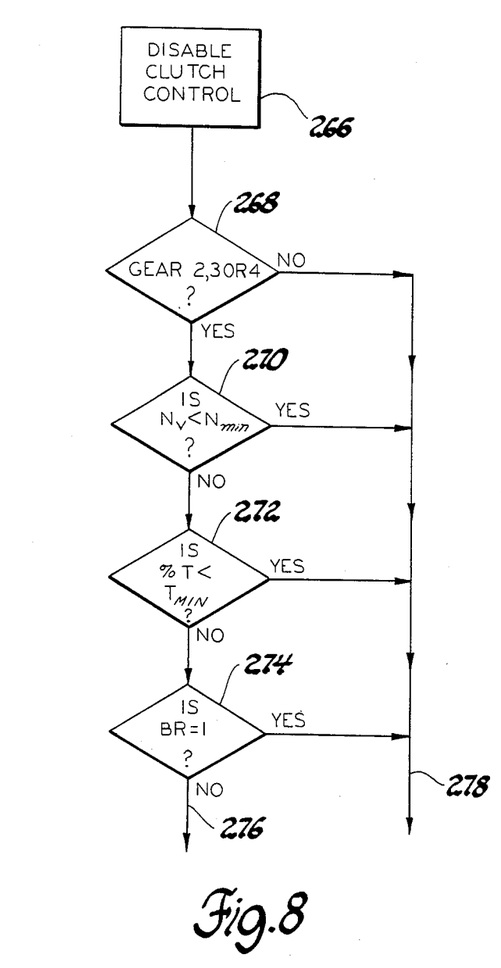
Figure 9:
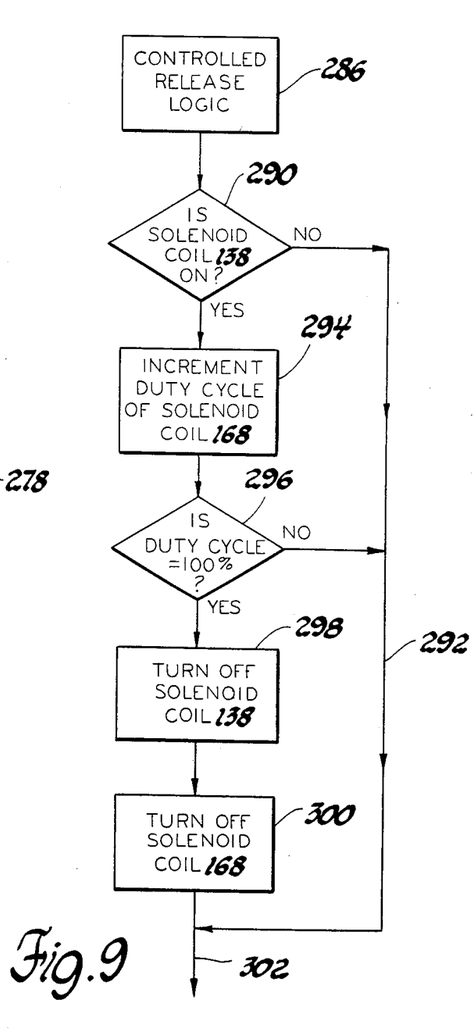

The control functions described above are carried out by the electronic control unit 180 when it executes a program instruction set represented by the flow diagrams depicted in FIGS. 7-9. Such program may be part of a much larger computer program for performing other control functions and is preferably executed on a timed interrupt basis. Since the response for the control system is relatively slow compared to the frequency of the engine torque perturbations, the interrupt can be generated at a relatively slow rate such as once every 30 milliseconds. At the generation of each interrupt, the program instructions depicted by the flow diagram of FIG. 7, are executed as indicated by the interrupt block 250. At the initiation of each such interrupt, the microcomputer 200 reads input values of the engine speed signal ($N_e$), the turbine speed signal ($N_t$) the brake signal (BR), the throttle signal (%T) and the gear ratio signal (GEAR), as indicated by instruction block 260. Then, as indicated by instruction block 262, the actual slip value $\Delta N$ and the vehicle speed $N_v$ are calculated. The slip value $\Delta N$ is calculated as a function of the difference between the engine speed $N_e$ and the turbine speed $N_t$; the vehicle speed $N_v$ is calculated as a function of the turbine speed $N_t$ and the transmission gear ratio (GEAR). Instruction block 264 is then executed to determine the slip reference value $\Delta N_{ref}$ and the throttle reference value $T_{ref}$. Such reference values may be stored in the memory of microcomputer 200 the form of a look-up table addressable as a function of one or two inputs. The reference slip speed $\Delta N_{ref}$ is addressable as a function of two inputs: turbine speed ($N_t$), and throttle position (%T). The throttle reference ($T_{ref}$) is addressable as a function of the transmission gear ratio (GEAR), it being understood that different engine throttle positions represent a given engine loading for the various speed ratios of the transmission.

At decision block 266, it is determined if the vehicle operating conditions are suitable for clutch control. The flow diagram of FIG. 8 provides a more detailed view of the vehicle parameters considered at decision block 266. Referring to that figure, it will be seen that the decision block 266 comprises a number of parameter testing decision blocks as indicated by the reference numerals 268, 270, 272 and 274. If the answer to any one of the decision blocks 268, 270, 272 or 274 indicates that clutch control is not appropriate, the flow diagram line 278 directs microcomputer 200 to execute the instruction blocks 280 and 282 of the FIG. 7 flow diagram to disable clutch control. Instruction block 280 serves to de-energize the solenoid coil 138 and instruction block 282 serves to de-energize the solenoid coil 168. The decision block 268 checks the value of GEAR to determine if the second, third or fourth transmission gear ratios are engaged. If not, clutch control is not appropriate and the execution of decision blocks 270, 272 and 274 is skipped as indicated by the flow diagram line 278. If so, decision block 270 checks the value of $N_v$ to determine if the vehicle speed is less than a minimum vehicle speed $N_{min}$ such as 20 miles per hour. If so, the execution of decision blocks 272 and 274 is skipped, as indicated by the flow diagram line 278. If not, decision block 272 is executed to check the value of %T to determine if the engine throttle setting is less than a minimum setting $T_{min}$ such as 5%. If so, the vehicle is likely coasting and clutch control is not appropriate. Consequently, the execution of decision block 274 is skipped as indicated by flow diagram line 278. If not, the decision block 274 is executed to determine if the vehicle brake pedal is depressed. If so, clutch control is not appropriate and further program execution is directed according to the flow diagram line 278. If not, the flow diagram line 276 directs the microcomputer 200 to execute the decision block 284 for determining if the engine throttle setting (%T) is greater than the reference throttle setting $T_{ref}$. If so, the driver of the vehicle has requested a relatively large increase in the vehicle performance and clutch control is not appropriate. In such case, the instruction block 286 is executed to release the clutch in a controlled manner as described in reference to FIGS. 6a-6c.

The controlled release logic is given in more detail in FIG. 9. Referring now more particularly to that figure, the decision block 290 is executed to determine if the solenoid coil 138 is energized to enable clutch control. If not, the remainder of the flow diagram of FIG. 9 is skipped as indicated by the flow diagram line 292. If so, instruction block 294 is executed to increase the energization duty cycle of solenoid coil 168 by an amount determined in conjunction with the interrupt frequency to produce a duty cycle increase of the type depicted by the reference numeral 240 in FIG. 6b. Such increase in duty cycle is chosen to yield a substantially jerk-free and yet responsive disengagement of the clutch mechanism 50 and preferably provides a duty cycle increase of approximately 20% per second. Then the decision block 296 is executed to determine if the energization duty cycle of solenoid coil 168 has been increased to 100%. If so, instruction blocks 298 and 300 are executed to de-energize the solenoid coils 138 and 168. If not, the execution of instruction blocks 298 and 300 is skipped as indicated by flow diagram line 292. Further flow diagram execution is then directed by the flow diagram line 302.

If it has been determined at decision blocks 266 and 284 that clutch control is appropriate, instruction block 304 is executed to energize the solenoid coil 138 to enable clutch control. Decision block 306 is then executed to compare the measured converter slip speed $\Delta N$ with the reference slip speed $\Delta N_{ref}$. If the measured slip speed $\Delta N$ is greater than the reference slip speed $\Delta N_{ref}$, the instruction block 308 is executed to decrease the energization duty cycle of solenoid coil 168 by an amount determined in conjunction with the interrupt frequency for producing a duty cycle rate of change, such as depicted by the negative going excursions of the trace 236 in FIG. 5b. This operation serves to increase the fluid pressure in apply chamber 60 of the clutch mechanism 50 to thereby increase the torque capacity of the clutch member 50. If the measured slip speed $\Delta N$ is less than the reference speed $\Delta N_{ref}$, the instruction block 310 is executed to increase the energization duty cycle of solenoid coil 168 by an amount determined in conjunction with the interrupt frequency to produce a duty cycle rate of change as depicted by the positive going excursions of the trace 236 in FIG. 5b. Such increase serves to decrease the fluid pressure to apply chamber 60 to thereby decrease the torque capacity of the clutch mechanism 50. As indicated above, the rate at which the energization duty cycle of solenoid 168 is increased or decreased establishes a predetermined time response characteristic for the control system, and such time response characteristic is chosen so as to be responsive to the relatively low frequency changes in slip due to changes in the steady state engine torque while being unresponsive to the relatively high frequency changes in slip due to engine torque perturbations. In the illustrated embodiment, such rate of increase is approximately 5% duty cycle per second.

The operation of the control system of this invention for a typical period of vehicle operation will now be described. The vehicle electrical system is enabled prior to engine start up and at such time the electronic control unit 180 begins to execute the flow diagram depicted in FIGS. 7-9. Initially, decision block 266 is answered in the affirmative and the solenoid coils 138 and 168 are de-energized in accordance with instruction block 280 and 282. In such case, the springs 136 and 166 assure that the valves 80, 128 and 122 assume the correct positions for disabling clutch control. In particular, the apply chamber 60 of the clutch mechanism 50 is exhausted to the fluid reservoir 70 through lines 160, 120 and 112, and the release chamber 62 of clutch mechanism 50 is supplied with fluid line pressure via lines 76 and 116. The above condition prevails until the parameter checks defined by the flow diagram of FIG. 8 each indicate that clutch control is appropriate. Thus the transmission must be in second gear or higher, the vehicle speed $N_v$ must be above a minimum value $N_{min}$, the throttle position %T must be greater than a minimum value $T_{min}$ and the brake pedal must be released. If such conditions are met, and the throttle position is less than the reference throttle position $T_{ref}$, the electronic control unit 180 energizes the solenoid coil 138 to shift the position of spool valve 80 by applying fluid pressure to chamber 102 thereof. In so doing, the fluid pressure in release chamber 62 of clutch mechanism 50 is exhausted through lines 116 and 110, and a relatively high fluid pressure is directed to apply chamber 60 of clutch mechanism 50 through lines 76, 98, 120, 160 and the control passage of torque capacity control valve 122. Then, the solenoid coil 168 of torque capacity control valve 122 is energized at a duty cycle determined in accordance with a comparison between the measured slip value and the reference slip value as graphically depicted in FIGS. 5a and 5b. If the measured slip value is greater than the reference slip value the duty cycle of solenoid coil 168 is decreased to increase the fluid pressure in apply chamber 60 for increasing the torque capacity of the clutch mechanism 50. If the measured slip value is less than the reference slip value, the duty cycle of solenoid coil 168 is increased to decrease the fluid pressure in chamber 60 for decreasing the torque capacity of the clutch mechanism 50. The flow diagram is executed at a periodic rate, and at each such execution for which clutch control is enabled, the duty cycle is increased or decreased by an amount which establishes the predetermined time response characteristic of the system.

The operation described above is continued so long as the conditions defined by decision blocks 266 and 284 indicate that clutch control is appropriate. If one of the conditions specified by block 266 (such as depression of the vehicle brake pedal), indicates that clutch control is not appropriate, the solenoid coils 128 and 168 are de-energized to exhaust the fluid pressure in the clutch apply chamber 60 and to supply line pressure to the clutch release chamber 62, thereby completely disengaging the clutch mechanism 50. If the conditions defined by decision block 266 are subsequently met, the clutch control is re-established as described above.

If, while the clutch control is in effect, the engine throttle position is increased above the reference throttle position $T_{ref}$, the clutch mechanism 50 is disengaged in a smooth and controlled manner by increasing the energization duty cycle of solenoid 168 at a relatively fast rate, such as designated by the reference numeral 240 in FIG. 6b. Such action serves to decrease the clutch engagement pressure in apply chamber 60 at a controlled rate thereby smoothly decreasing the torque capacity of the clutch mechanism 50. During such torque capacity decrease, the converter slip is allowed to increase as desired to permit the attainment of higher engine speeds and to take advantage of the torque multiplication afforded by torque converter 12. When the energization duty cycle of solenoid 168 has been increased to 100%, the clutch mechanism 50 is at minimum capacity and the electronic controller 180 de-energizes both solenoid coils 138 and 168. When the vehicle operating conditions change and the engine throttle setting once again drops below the reference throttle setting, clutch control is resumed in the manner described above, providing the conditions defined by decision block 266 are met.

In certain applications, it may be desired to rapidly disengage the clutch mechanism 50 at initiation of a shift from one gear ratio to another in order to improve the shift feel. One way of achieving this result would be to rapidly increase the energization duty cycle of solenoid coil 168 to 100% at the onset of a gear shift and thereafter, to enable the clutch control system of this invention.

While this invention has been described in reference to the illustrated embodiment, it will be understood that various modifications thereto will occur to those skilled in the art and that systems incorporating such modifications may fall within the scope of this invention, which is defined by the appended claims.

The embodiments of the invention in which an exclusive property or privilege is claimed are defined as follows:

1. In a motor vehicle including a torque converter adapted to receive engine torque through an input member thereof and to supply torque to the vehicle drivetrain through an output member thereof, a clutch mechanism connected between the input and output members of said torque converter, the clutch mechanism being operative when fully engaged to prevent slip between such input and output members to thereby provide torque capacity at least as great as the engine torque, and when less than fully engaged to permit slip between such input and output members to thereby provide torque capacity less than the engine torque, and a clutch actuating mechanism for controlling the torque capacity of said clutch according to the fluid pressure in a control chamber thereof, a method of operating said clutch mechanism so as to avoid the passage of engine torque perturbations therethrough, comprising the steps of:

measuring the torque converter slip;

determining the difference between the measured slip and a reference slip amount; and altering the fluid pressure in said clutch actuating mechanism control chamber according to the sense of such difference without regard to the magnitude of such difference in a manner to increase or decrease the torque capacity of said clutch mechanism at a predetermined rate when the measured slip is respectively greater than and less than the reference slip amount, the predetermined rate defining a predetermined time response characteristic which prevents significant increase or decrease of the clutch mechanism torque capacity in response to the relatively high frequency variations in slip due to engine torque perturbations while permitting increasing and decreasing of the clutch mechanism torque capacity in response to the relatively low frequency variations in slip due to changes in the engine torque and drivetrain load, whereby the engine torque perturbations are absorbed in the torque converter instead of the drivetrain and the average amount of the torque converter slip over a period of vehicle operation is maintained at the reference slip amount.

2. A method as set forth in claim 1, including the step of:

progressively altering the fluid pressure in said clutch actuating mechanism control chamber at a controlled rate and in a direction to decrease the torque capacity of said clutch mechanism at the onset of a relatively heavy engine loading condition, thereby to progressively disengage said clutch mechanism.

3. A method as set forth in claim 1, including the step of:

adjusting the reference slip amount in relation to a predicted level of engine torque perturbation such that the torque capacity of the clutch mechanism is controlled at a value less than the lower peak excursion of the engine torque thereby to avoid full engagement of said clutch mechanism and the consequent passage of said engine torque perturbation therethrough.

4. A method as set forth in claim 1, including the steps of:

predicting the level of engine torque perturbation as a function of the engine load setting and the torque converter output member speed; and adjusting the reference slip amount in relation to the predicted level of engine torque perturbation such that the torque capacity of the clutch mechanism is controlled at a value less than the lower peak excursion of the engine torque thereby to avoid full engagement of said clutch mechanism and the consequent passage of said engine torque perturbation therethrough.

5. In a motor vehicle including a torque converter adapted to receive engine torque through an input member thereof and to supply torque to the vehicle drivetrain through an output member thereof and a clutch mechanism connected between the input and output members of said torque converter, the clutch mechanism being operative when fully engaged to prevent slip between such input and output members to thereby provide torque capacity at least as great as the engine torque, and when less than fully engaged to permit slip between such input and output members to thereby provide torque capacity less than the engine torque, a system for controlling the operation of the clutch so as to avoid the passage of engine torque perturbations therethrough, comprising:

slip control means including a clutch actuating mechanism for controlling the torque capacity of said clutch according to the fluid pressure in a control chamber thereof, electrically operated valve means connected to the control chamber of said clutch actuating mechanism energizable to produce variable fluid pressure therein for varying the torque capacity of the clutch mechanism, and slip responsive means for energizing said valve means in a manner to increase or decrease the torque capacity of said clutch according to a predetermined time response characteristic when the torque converter slip is respectively greater than or less than a reference slip amount without regard to the magnitude of the difference therebetween, said predetermined time response characteristic being such that the slip control means is ineffective to significantly adjust the torque capacity of the clutch in response to the relatively high frequency variations in slip due to engine torque perturbations whereby the engine torque perturbations are absorbed in the torque converter instead of the drivetrain and the average amount of torque converter slip over a period of vehicle operation is maintained at the reference slip amount.

6. A system as set forth in claim 5, wherein:
the electrically operated valve means includes a fluid supply mechanism movable to first or second positions for supplying the clutch actuating mechanism with fluid pressure tending to increase or decrease the torque capacity of said clutch mechanism, means for biasing said fluid supply mechanism to one of said first and second positions, and coil means energizable to move the fluid supply mechanism to the other of said first and second positions, and
the slip responsive means includes means for energizing said coil means at a duty cycle which is increased or decreased at a predetermined rate, which rate establishes said predetermined time response characteristic.

7. A system as set forth in claim 6, including:
means effective at the onset of a relatively heavy engine loading condition for progressively adjusting the energization duty cycle of said coil means at a controlled rate and in a direction to decrease the torque capacity of said clutch mechanism thereby progressively disengaging said clutch mechanism.

8. A system as set forth in claim 5, including reference means for adjusting the reference slip amount in relation to a predicted level of engine torque perturbation such that the torque capacity of the clutch is controlled at a value less than the lower peak excursion of the engine torque thereby to avoid full engagement of said clutch mechanism and the consequent passage of said engine torque perturbation therethrough.

9. A system as set forth in claim 8 wherein:
the reference means includes means for predicting the level of engine torque perturbation as a function of the load setting of the vehicle engine and the speed of the torque converter output member.

10. In a motor vehicle including a source of fluid pressure, a torque converter adapted to receive engine torque through an input member thereof and to supply torque to the vehicle drivetrain through an output member thereof, a clutch mechanism connected between the input and output members of said torque converter, the clutch mechanism being operative when fully engaged to prevent slip between such input and output members to thereby provide torque capacity at least as great as the engine torque, and when less than fully engaged to permit slip between such input and output members to thereby provide torque capacity less than the engine torque, a system for controlling the operation of the clutch so as to avoid the passage of engine torque perturbations therethrough, comprising:

clutch actuating means for developing clutch engagement force according to the fluid pressure in an apply chamber thereof and clutch disengagement force according to the fluid pressure in a release chamber thereof for controlling the torque capacity of said clutch mechanism;

fluid directing means connected between said fluid source and said clutch actuating means including first and second electrically actuated valve mechanisms, the first valve mechanism being selectively actuable to a clutch enable state enabling clutch engagement for which state the release chamber of said clutch actuating means is exhausted to a low pressure level and the apply chamber of said clutch actuating means is connected to said source of fluid pressure through the second valve mechanism, and a clutch disable state disabling clutch engagement for which state the apply chamber is exhausted to a low pressure level and the release chamber is connected to said source of fluid pressure, and the second valve mechanism being selectively actuable to an apply state for which fluid pressure from said first valve mechanism is directed to said apply chamber and a release state for which fluid pressure from said first valve mechanism is exhausted to a low pressure level; and electronic control means effective when control of said clutch mechanism is desired for actuating said first valve mechanism to its clutch enable state and for alternately actuating said second valve mechanism between its apply and release states at a duty cycle which increases or decreases the clutch engagement force according to a predetermined time response characteristic when the torque converter slip is respectively greater than or less than a reference slip amount without regard to the magnitude of the difference therebetween, said predetermined time response characteristic being such that the slip control means is ineffective to significantly adjust the torque capacity of the clutch in response to the relatively high frequency variations in slip due to engine torque perturbations whereby the engine torque perturbations are absorbed in the torque converter instead of the drivetrain and the average value of the torque converter slip over a period of vehicle operation is maintained at the reference slip value.

11. A system as set forth in claim 10, wherein said electronic control means includes:

means effective at the onset of a relatively heavy engine loading condition for progressively adjusting the actuation duty cycle of said second valve mechanism at a controlled rate and in a direction to decrease the clutch engagement force developed by said clutch actuating means to thereby progressively decrease the torque capacity of said clutch mechanism, and for actuating said first valve mechanism to its clutch disable state to disable further clutch engagement when the actuation duty cycle of said second valve means has been adjusted to a limit value for which the clutch engagement force is at a minimum.

* * * * *